(12) United States Patent
Matsuzawa

(10) Patent No.: US 8,615,568 B2
(45) Date of Patent: Dec. 24, 2013

(54) PRESENCE INDICATIVE TERMINAL DEVICE AND PRESENCE MANAGING SYSTEM

(75) Inventor: Koji Matsuzawa, Ayase (JP)

(73) Assignee: Access Co., Ltd., Tokyo (JP)

( * ) Notice: Subject to any disclaimer, the term of this patent is extended or adjusted under 35 U.S.C. 154(b) by 1137 days.

(21) Appl. No.: 12/083,948

(22) PCT Filed: Oct. 17, 2006

(86) PCT No.: PCT/JP2006/320633
§ 371 (c)(1),
(2), (4) Date: Apr. 21, 2008

(87) PCT Pub. No.: WO2007/046364
PCT Pub. Date: Apr. 26, 2007

(65) Prior Publication Data
US 2009/0292769 A1    Nov. 26, 2009

(30) Foreign Application Priority Data

Oct. 21, 2005  (JP) .................................. 2005-306712

(51) Int. Cl.
*G06F 15/16*       (2006.01)
(52) U.S. Cl.
USPC ......................................... 709/219; 709/203
(58) Field of Classification Search
USPC ............................................... 709/203, 219
See application file for complete search history.

(56) References Cited

U.S. PATENT DOCUMENTS

| | | | |
|---|---|---|---|
| 6,510,452 B1 * | 1/2003 | Brisebois et al. ............ | 709/204 |
| 2003/0233537 A1 * | 12/2003 | Wohlgemuth et al. ........ | 713/151 |
| 2006/0167991 A1 * | 7/2006 | Heikes et al. ............ | 709/204 |
| 2006/0195587 A1 * | 8/2006 | Cadiz et al. ................. | 709/227 |

FOREIGN PATENT DOCUMENTS

| | | |
|---|---|---|
| JP | 2004-193735 A | 7/2004 |
| JP | 2005-038206 A | 2/2005 |
| JP | 2005-135250 A | 5/2005 |

OTHER PUBLICATIONS

International Search Report mailed on Jan. 16, 2007, for PCT Application No. PCT/JP2006/320633 filed on Oct. 17, 2006, 6 pages.
Matsumoto, Minoru et al. (2002). "Event Driven-gata Presence Joho Tsuchi Hoshiki ni Kansuru Kento," *IEICE Technical Report* 101(715):185-190.
Suzuki, Shigefusa et al. (2003). "Presence to Iu Na no BB Jidai no Aratana Service ni Mukete," *NTT Gijutsu Journal* 15(6):62-65.
Takebe, Ken'ichi et al. (2005). "Kigyo o Atsukusuru Saishin Technology Presence Jotai o Jido Henko Suru Gijutsu ga Jitsuyoka Hito no 'Jotai' o Real Time ni Tsuchi Kigyomuke wa 'SIMPLE' Gijutsu ga Shuryu," *Nikkei Communications* No. 447:96-103.
Office Action received for Japanese Patent Application No. 2007-540977, mailed on Jul. 2, 2012, 5 pages (3 pages of English Translation and 2 pages of Office Action).

* cited by examiner

*Primary Examiner* — April Y Blair
(74) *Attorney, Agent, or Firm* — Morrison & Foerster LLP

(57) ABSTRACT

Provided is a presence display terminal device comprising a registration unit for registering presence targets, an update information receiving unit for receiving update information indicating an update of the presence targets registered, a control unit for displaying a predetermined one of the presence targets registered, in a screen, and an update presence information acquisition unit for deciding it on the basis of the update information whether or not the presence target displayed on the screen is to be updated, thereby to acquire the updated presence information of the presence target decided to have been updated.

20 Claims, 20 Drawing Sheets

PRESENCE INDICATIVE TERMINAL DEVICE AND PRESENCE MANAGING SYSTEM

FIELD OF THE INVENTION

Figure 1:
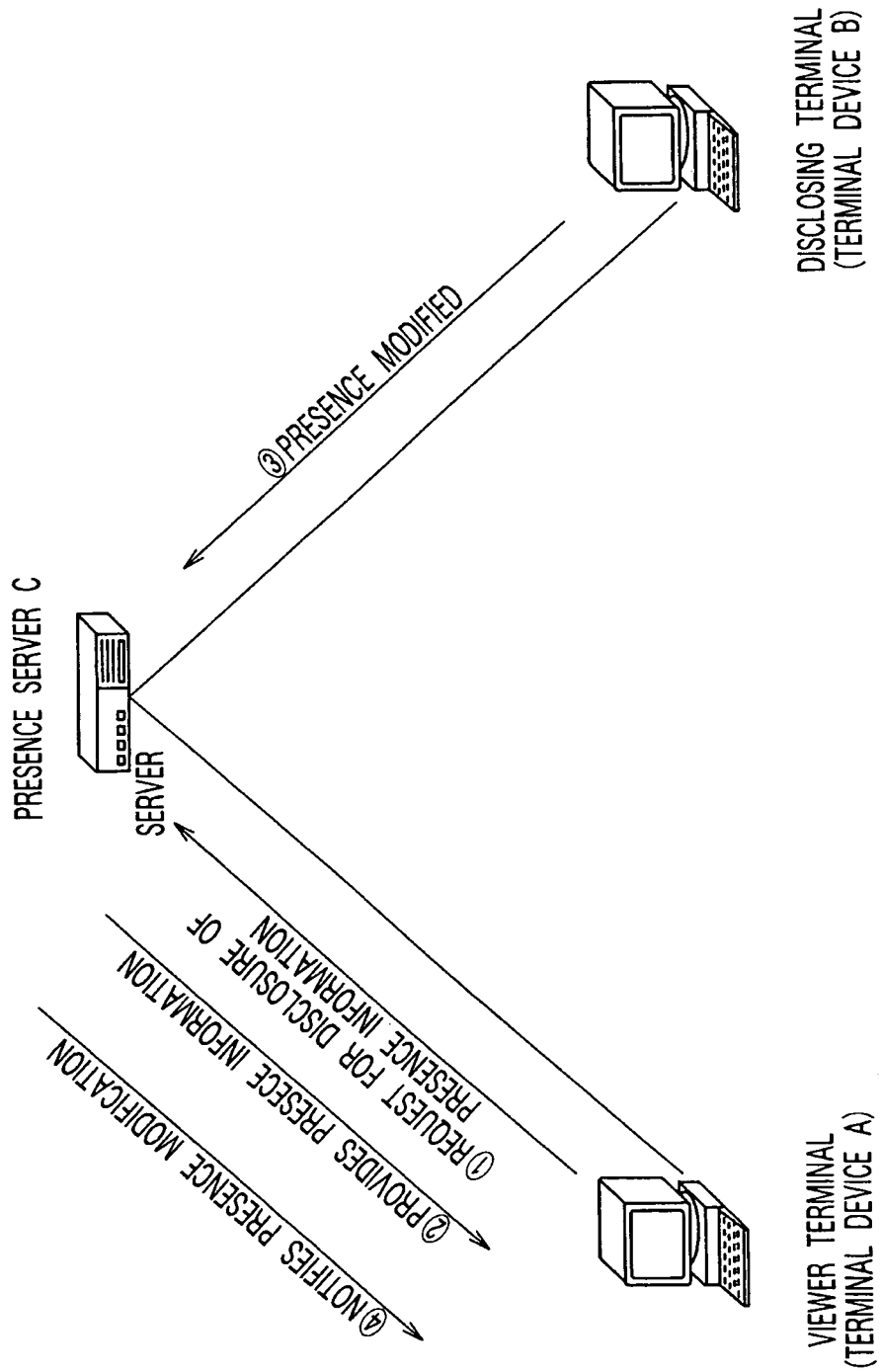

The present invention relates to a presence indicative terminal device having a presence indicative feature and a presence managing system.

BACKGROUND OF THE ART

Various communication services have been provided in accordance with development of broadband services. Such services include, for example, internet telephones and instant message (IM) services.

For example, when a telephone call is made through internet telephones, the communication cannot be established when one of the users on the other side, a communicatee, is not accessing the network; therefore, the user at each end is required to recognize as to whether the other user is logged on the network. Therefore, presence indication is suggested. The presence refers to functionality to achieve information concerning status of the user at the other end of the communication. Leading techniques to achieve the presence include SIP (Session Initiation Protocol). SIP is one of communication protocols which can be used in internet telephones based on VoIP (Voice over Internet Protocol).

In recent years, such presence-enabled functionality has been installed in mobile phones. With the presence-enabled functionality installed in the mobile phones can allow a user to recognize in advance availability of the user at the other end who may be busy on another line, out of the office, or at a meeting. Therefore, the user can check the availability of the communicatee at the other end so that the user can contact the communicatee in a most preferable method such as in audio phone call, an instant message, or an e-mail.

In a conventional presence managing system, for example, a terminal device A requests a presence server C to disclose the presence information of a terminal device B or another terminal device (in other words, register the terminal device B or another terminal device as a presence-enabled target in a list equipped in the terminal device A) so that information concerning update of the presence information is PUSH-delivered to the terminal device A when the presence information of the disclosing terminal is updated.

In some cases of a presence managing system, for example, the terminal device A may view presence information of a plurality of presence disclosing terminals. In Japanese Patent Provisional Publication No. 2005-135250, a terminal device, having an area to display the presence information of the plurality of disclosing terminals being variable, is disclosed. Meanwhile, Japanese Patent Provisional Publication No. 2005-135250 discloses a configuration, in which a display/hide (flag) setting of presence information can be determined by a user, in which a display area can be enlarged/reduced (or scrollable/unscrollable can be switched) according to an amount of the presence information to be displayed, and in which presence disclosing terminals online can be selectively displayed.

DISCLOSURE OF THE INVENTION

Henceforth, it can be required to register the presence-enabled targets in a mobile terminal device. In this regard, it is easily presumed that the presence information of all the presence-enabled targets is updated at a time. However, when the presence server PUSH-delivers the updating presence information of all the registered presence-enabled targets, and the mobile terminal devices receive all of the updated information, a volume of data traffic can be largely increased, and the communication environment can be burdened.

In view of the above-described problem, the present invention is aimed to provide a presence indicative terminal device and a presence managing system, in which a volume of data exchanged for updating presence information can be reduced. In order to accomplish the above objective, according to an aspect of the present invention, there is provided a presence indicative terminal device, having a registration unit to register presence-enabled targets, an update information receiving unit to receive update information, which represents presence information of the presence-enabled targets being registered is updated, a display control unit to display predetermined presence-enabled targets among the presence-enabled targets being registered, and an updated presence information obtaining unit to judge as to whether the presence information of the presence-enabled targets to be displayed by the display control unit should be updated based on the update information and obtain updated presence information of the presence-enabled targets of which presence information is judged to be updated.

Further, according to another aspect of the present invention, there is provided a presence managing system, having at least one first terminal device to view presence information, at least one second terminal device to disclose the presence information, and a server, and the server is provided with a presence information containing unit to contain the presence information of the second terminal device, a presence-enabled target registration information containing unit to contain presence-enabled target registration information, which represents the second terminal device being registered as a presence-enabled target in the first terminal device, and an update information transmitting unit to transmit update information, which represents update of the presence information of the second terminal device, to the first terminal device, in which the second terminal device is registered as the presence-enabled target, based on the presence indicative terminal registration information being contained when the presence information of the second terminal device is updated, and the first terminal device is provided with a registration unit to register the presence-enabled target, an update information receiving unit to receive the update information, which represents the presence information of the presence-enabled target being registered is updated, a display control unit to display a predetermined presence-enabled target among the presence-enabled targets being registered, and an updated presence information obtaining unit to judge as to whether the presence information of the presence-enabled target to be displayed by the display control unit should be updated based on the update information and obtain updated presence information of the presence-enabled target of which presence information is judged to be updated.

Thus, according to some aspects of the present invention, it can be considered that the presence information to be displayed on the screen is desired to be updated by the user; therefore, the presence information specifically desired by the user to be updated can be selectively updated so that the data traffic to be exchanged to update the presence information can be reduced.

Hereinafter, referring to accompanying drawings, a presence indicative terminal device and a presence managing system according to an illustrative embodiment of the present invention will be described.

BRIEF DESCRIPTION OF ACCOMPANYING DRAWINGS

[FIG. 1] A diagram to illustrate a presence managing system configured with terminal devices and a presence server according to an embodiment of the present invention.

Figure 2:
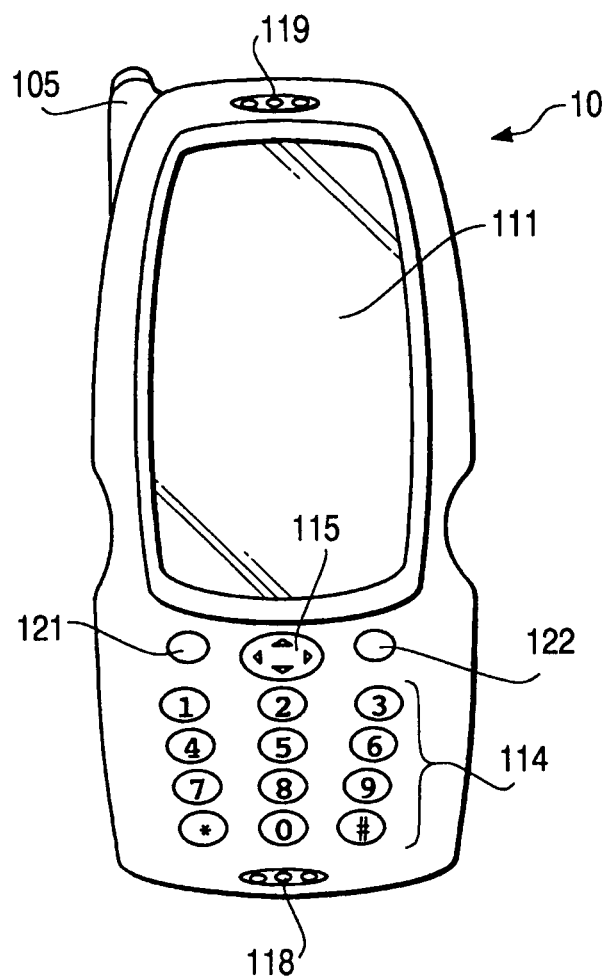

[FIG. 2] A diagram to illustrate an external view of the terminal device according to the embodiment of the present invention.

Figure 3:
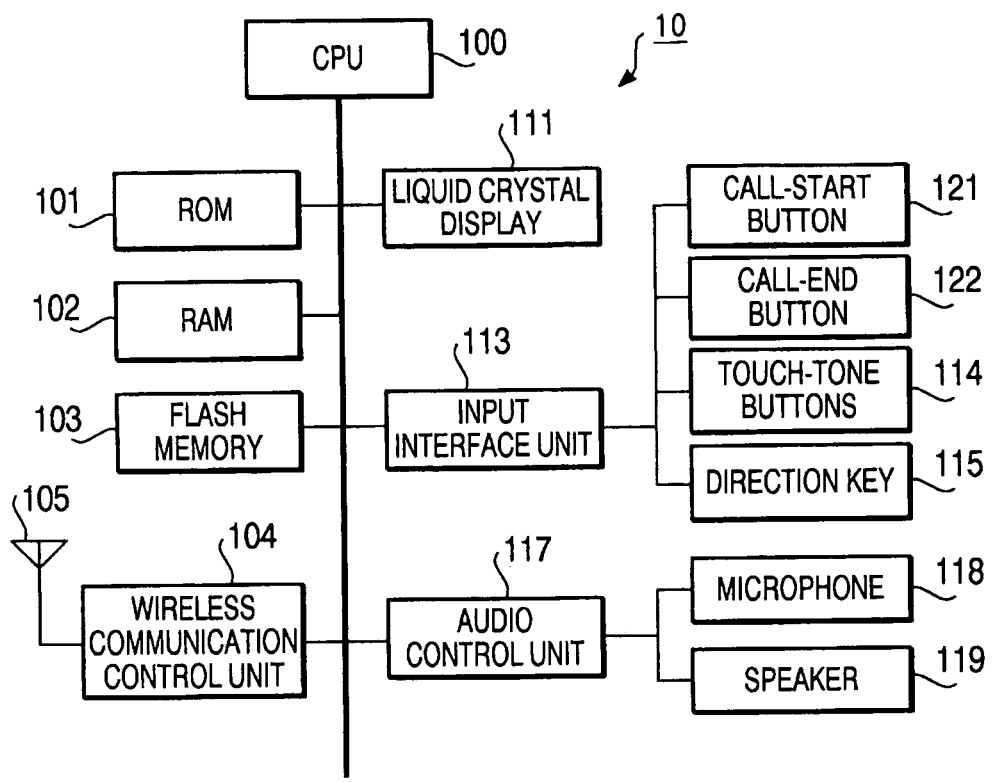

[FIG. 3] A diagram to illustrate a hardware configuration of the terminal device according to the embodiment of the present invention.

Figure 4:
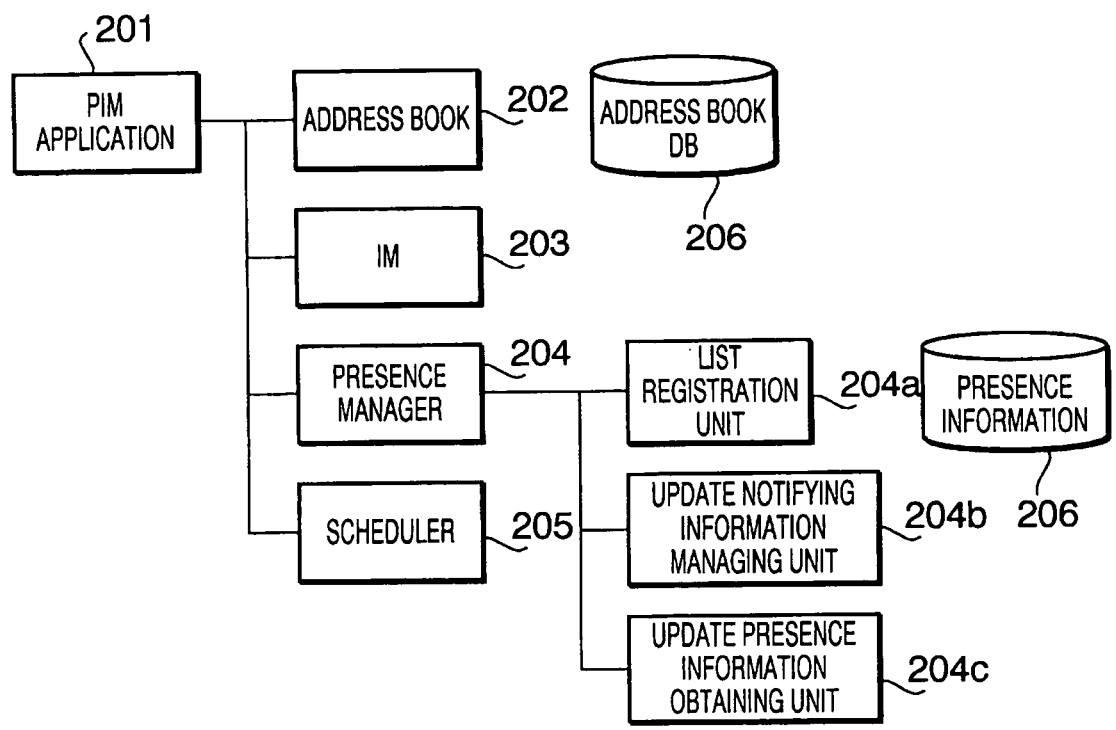

[FIG. 4] A diagram to illustrate a software configuration of the terminal device according to the embodiment of the present invention.

Figure 5:
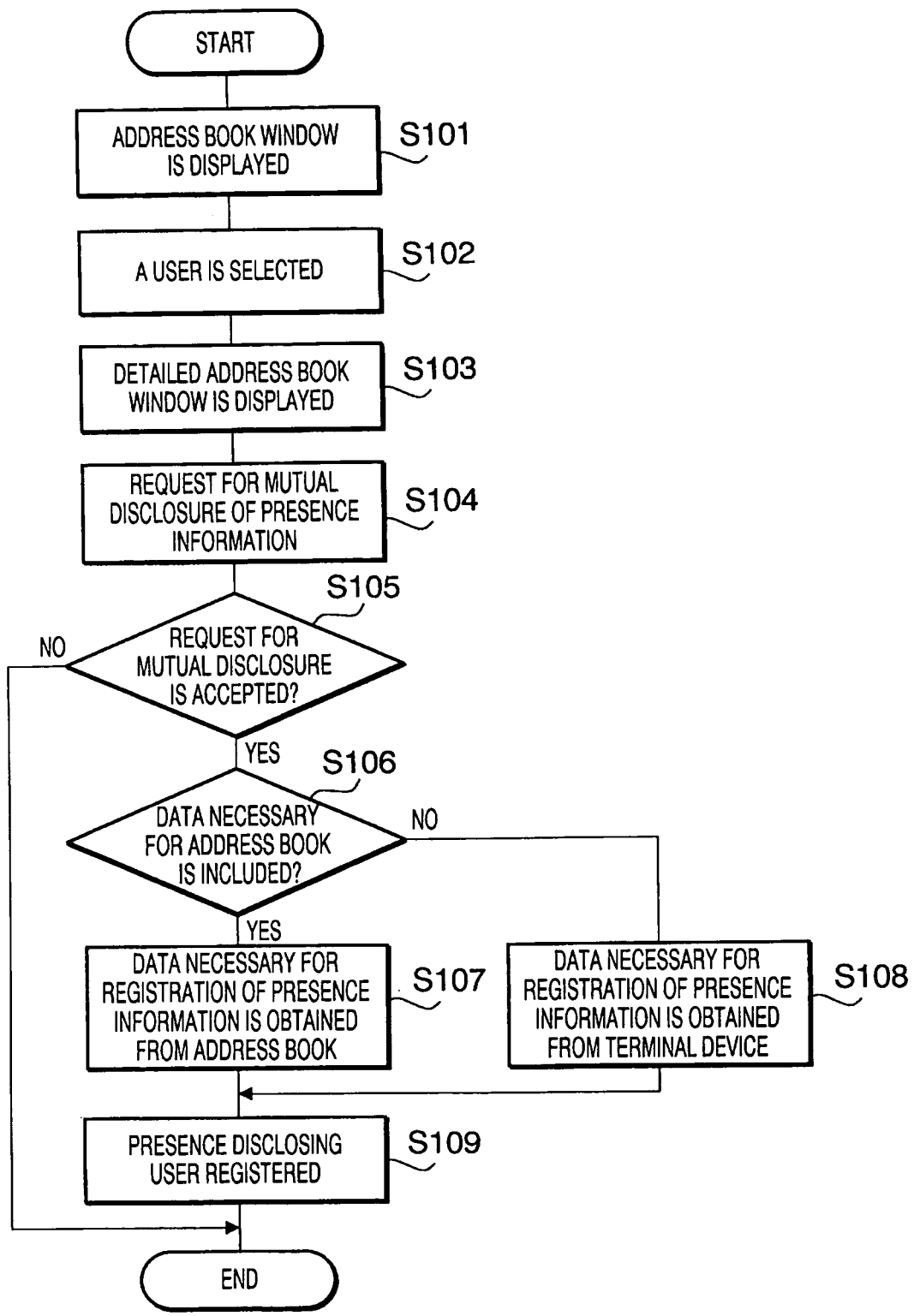

[FIG. 5] A flowchart to illustrate a process to register a user who is registered in an address book as a presence-enabled target.

Figure 6:
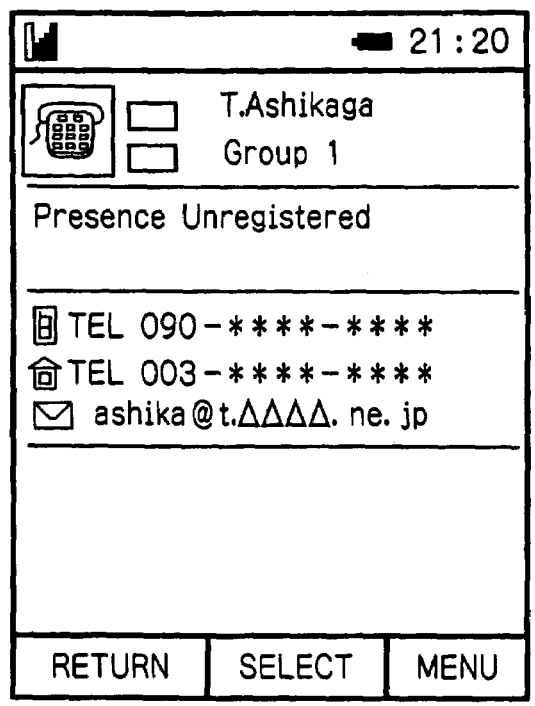

[FIG. 6] A diagram to illustrate a detailed address window.

Figure 7:
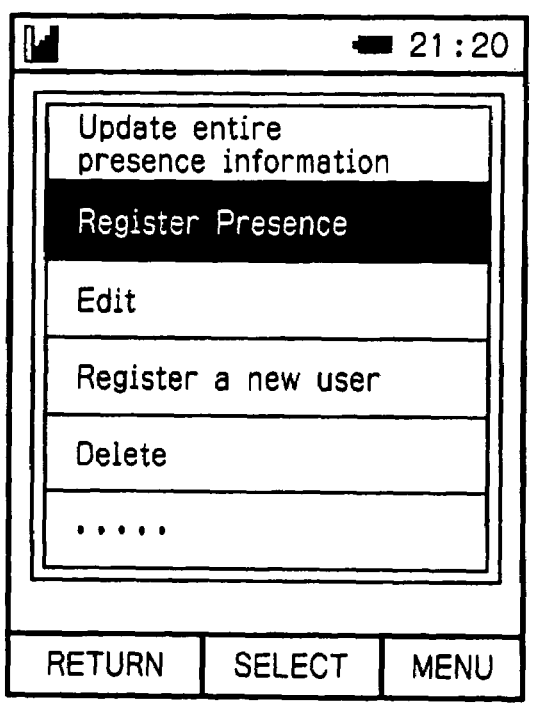

[FIG. 7] A diagram to illustrate an address book menu window.

Figure 8:
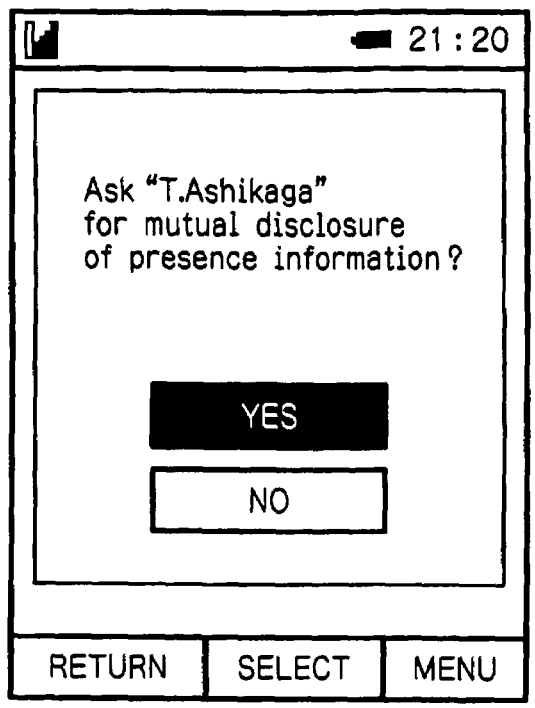

[FIG. 8] A diagram to illustrate an inquiry window for presence registration.

Figure 9:
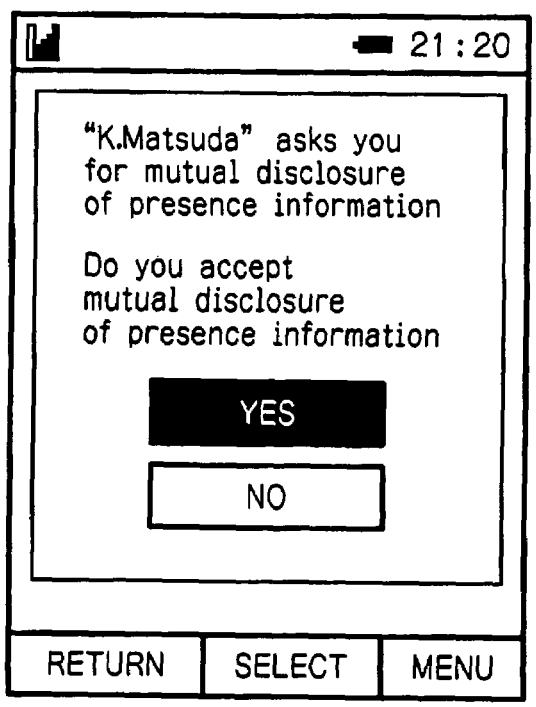

[FIG. 9] A diagram to illustrate an inquiry window concerning mutual presence disclosure.

Figure 10:
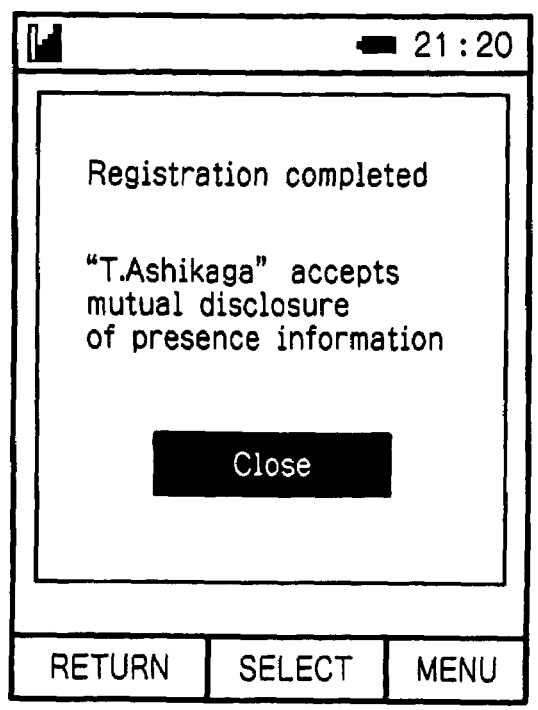

[FIG. 10] A diagram to illustrate a notification window concerning the mutual presence disclosure.

[FIG. 11] Diagrams to illustrate transition of screens to an editing window for a user's own presence.

[FIG. 12] Diagrams to illustrate transition of screens to modify the presence information.

Figure 13:
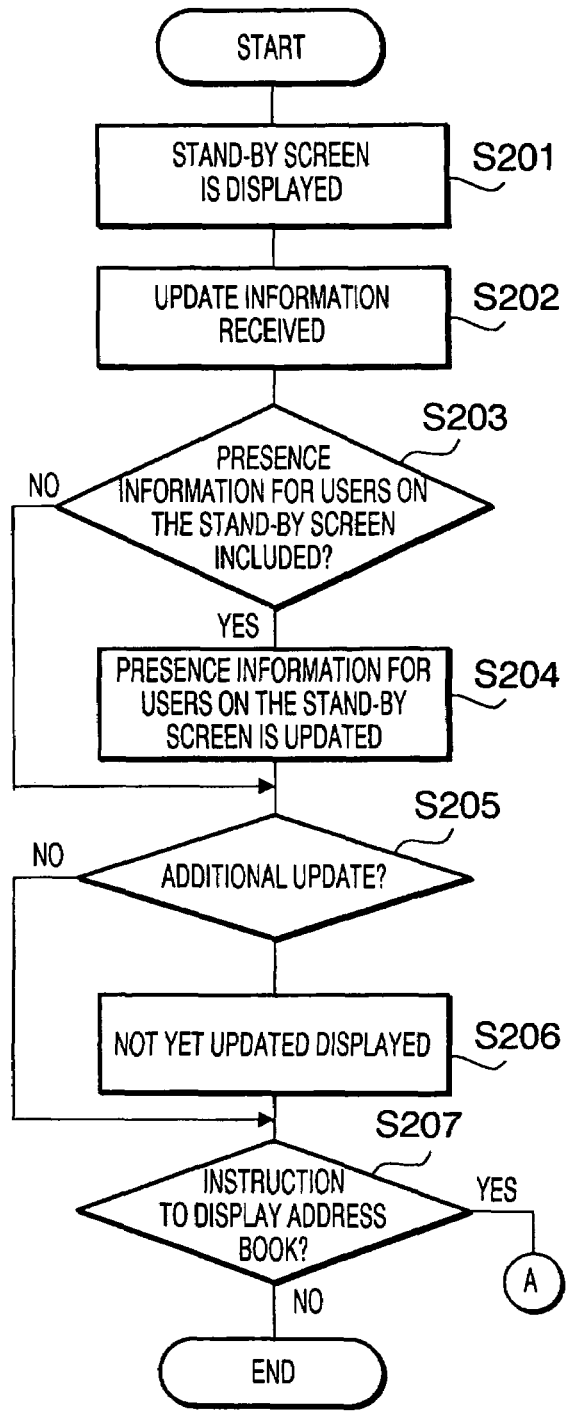

[FIG. 13] A flowchart to illustrate a process to be executed when the presence information of a presence disclosing user being displayed on the screen is updated.

Figure 14:
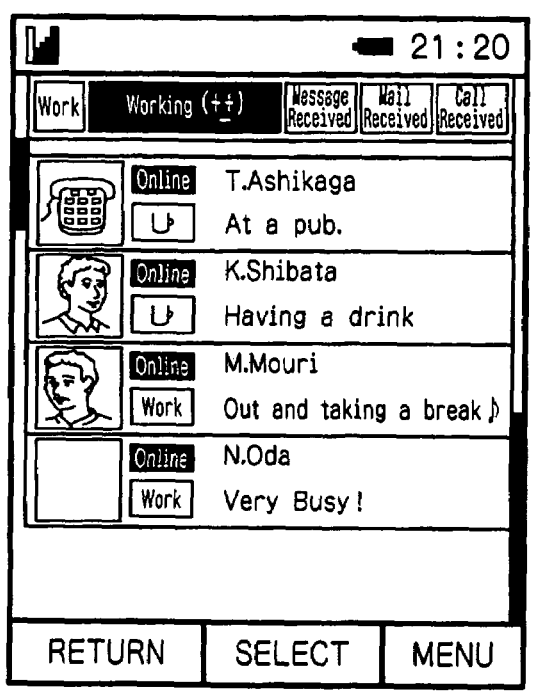

[FIG. 14] A diagram to illustrate a standby screen.

Figure 15A:
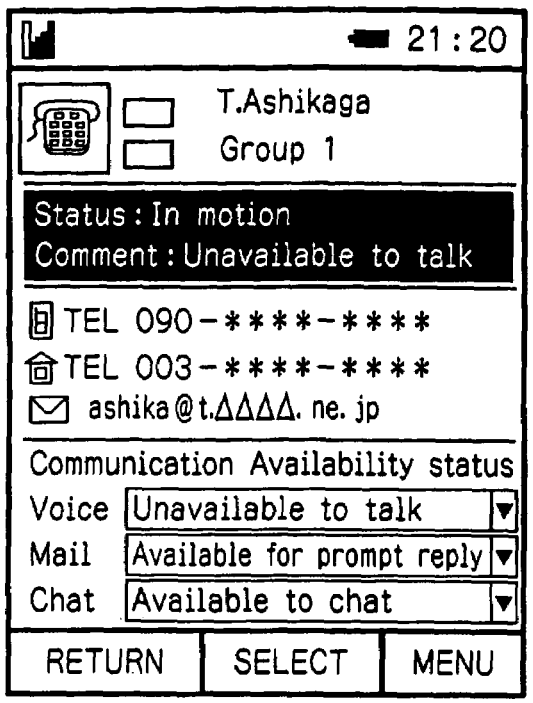
Figure 15B:
Figure 15C:
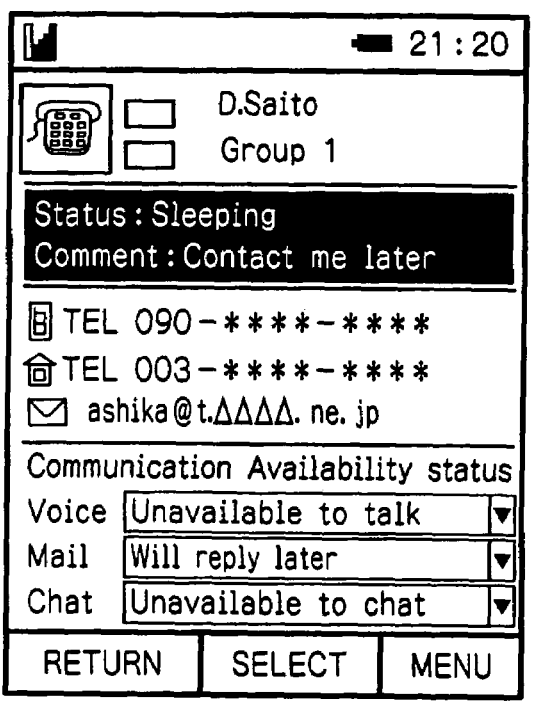

[FIG. 15] Diagrams to illustrate the presence information being updated in other terminal devices.

Figure 16:
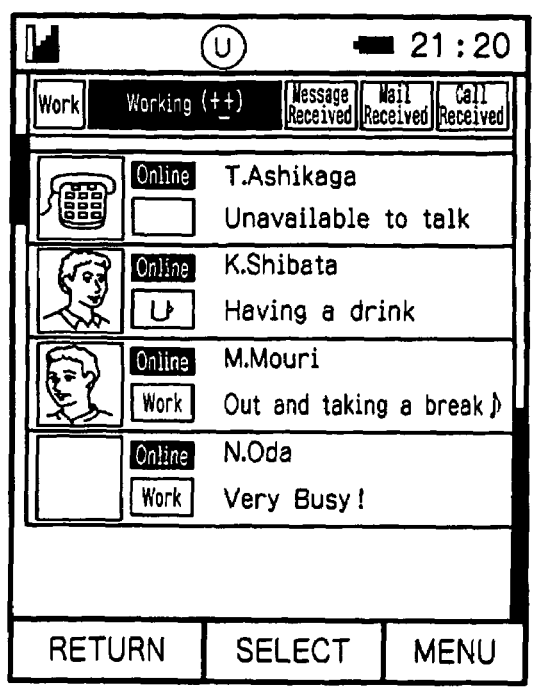

[FIG. 16] A diagram to illustrate the standby screen.

Figure 17:
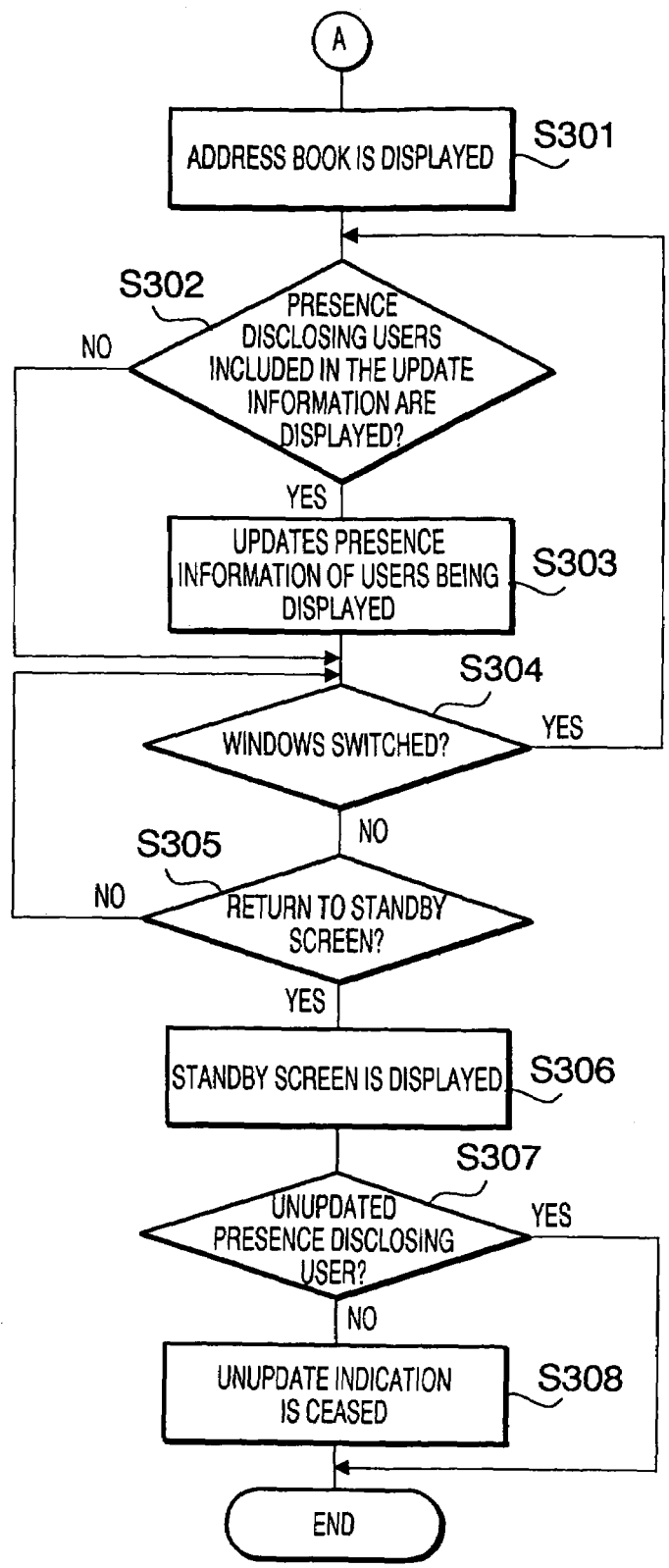

[FIG. 17] A flowchart (A) to illustrate a process to be performed to update the presence information of the presence disclosing user being displayed in an address book window.

Figure 18:
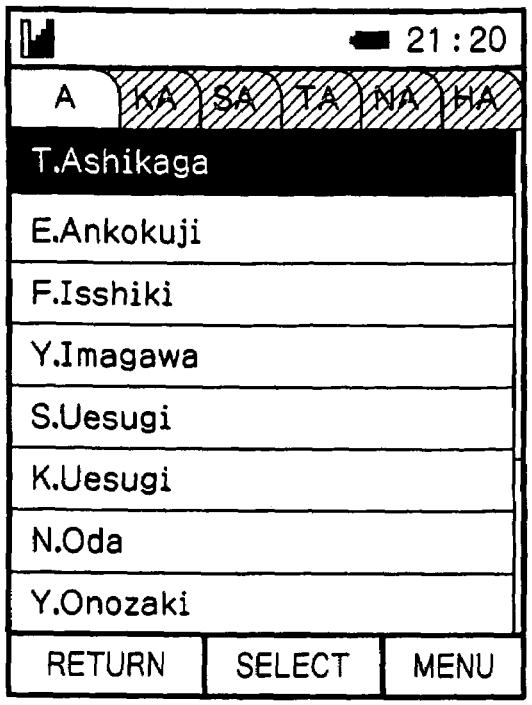

[FIG. 18] A diagram to illustrate the address book window.

Figure 19:
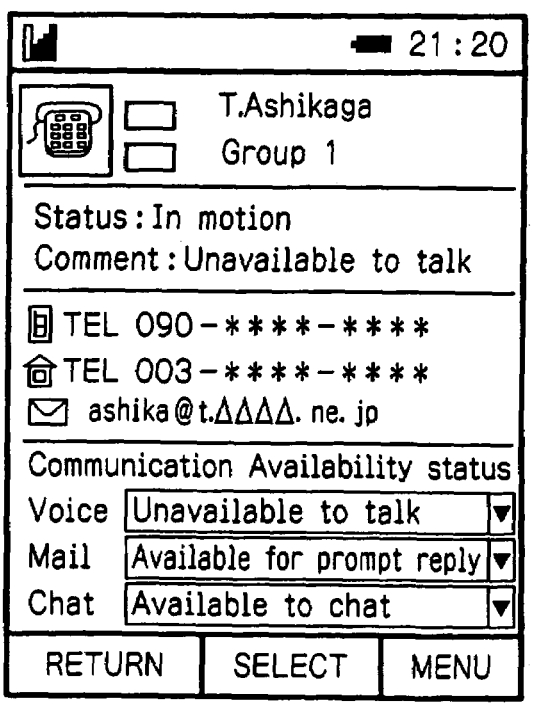

[FIG. 19] A diagram to illustrate a detailed address book window.

Figure 20:
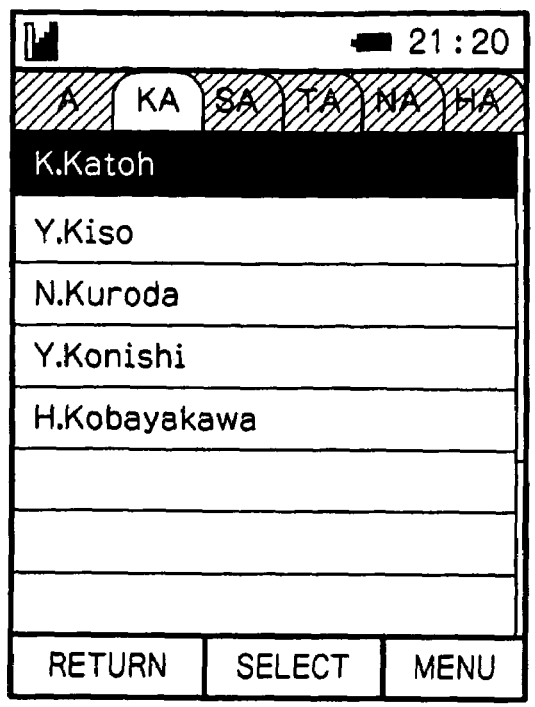

[FIG. 20] A diagram to illustrate the address book window.

Figure 21:
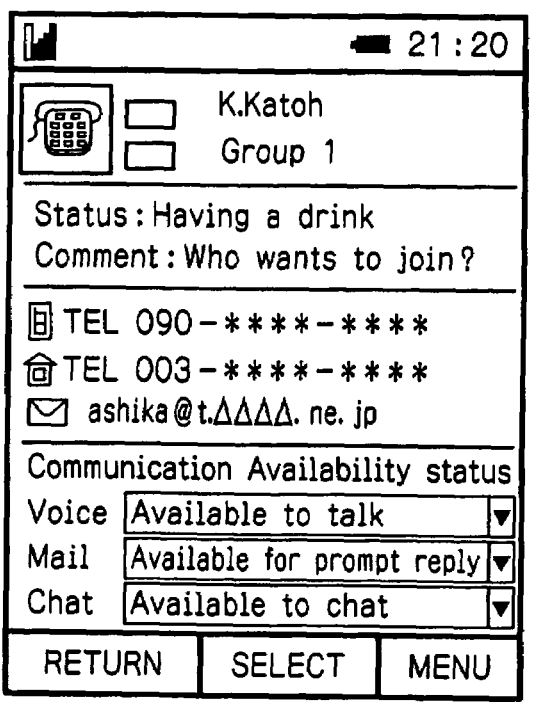

[FIG. 21] A diagram to illustrate the detailed address book window.

Figure 22:
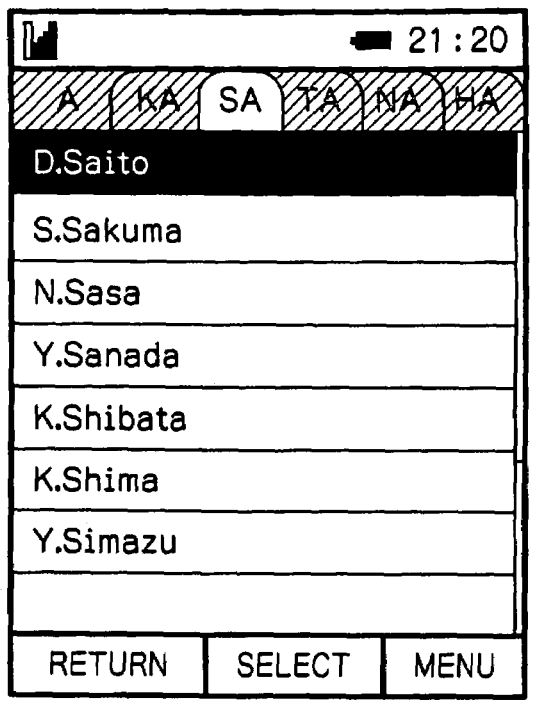

[FIG. 22] A diagram to illustrate the address book window.

Figure 23:
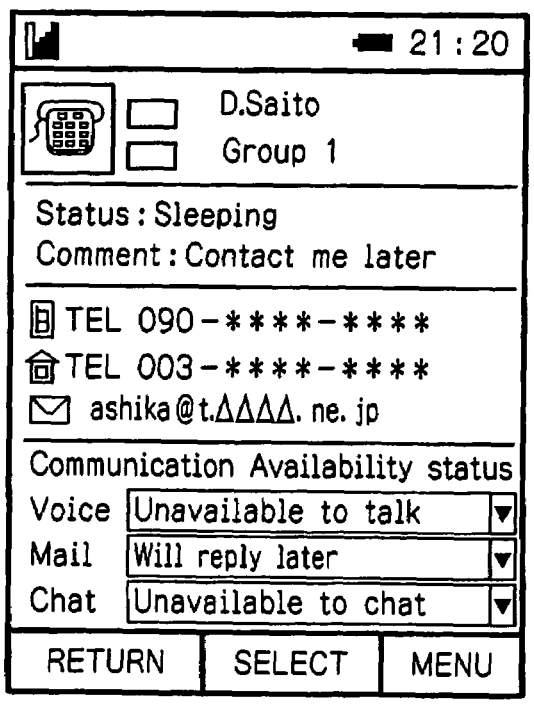

[FIG. 23] A diagram to illustrate the detailed address book window.

Figure 24:
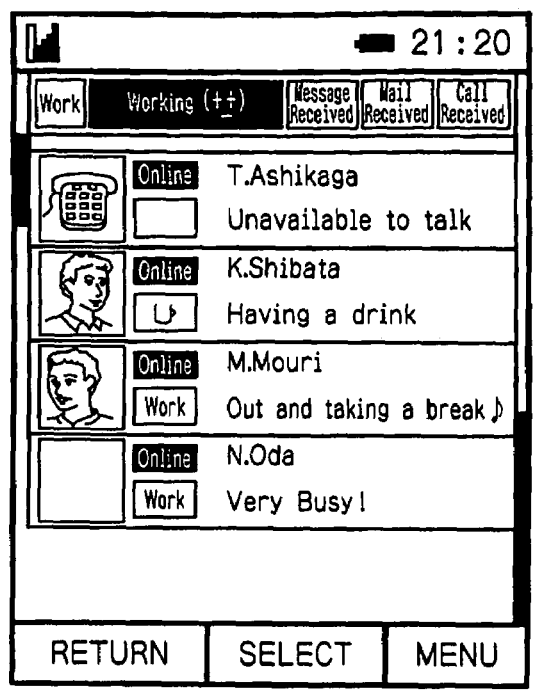

[FIG. 24] A diagram to illustrate the standby screen.

Figure 25:
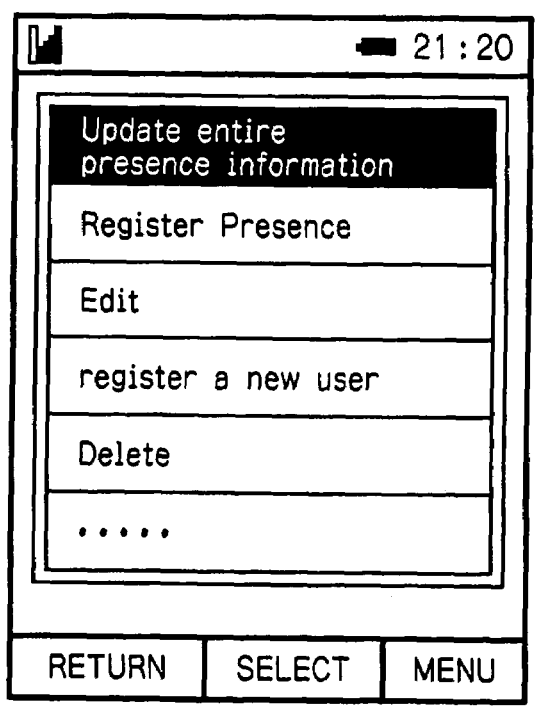

[FIG. 25] A diagram to illustrate a menu window for the address book.

Figure 26:
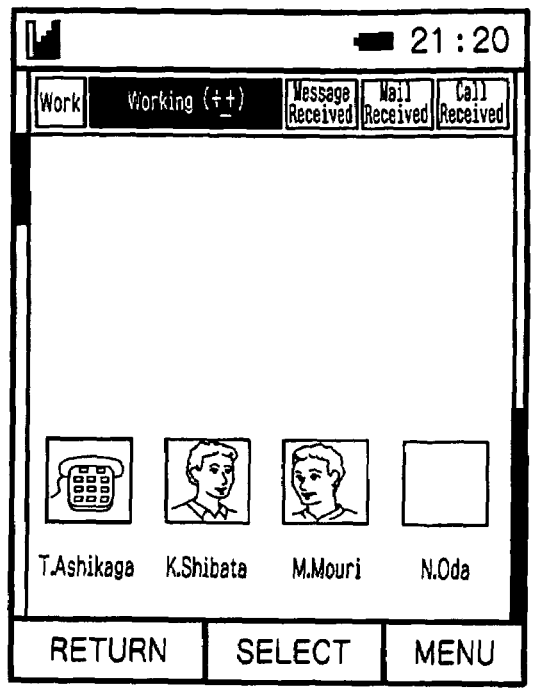

[FIG. 26] A diagram to illustrate another embodiment of the standby screen.

Figure 27:
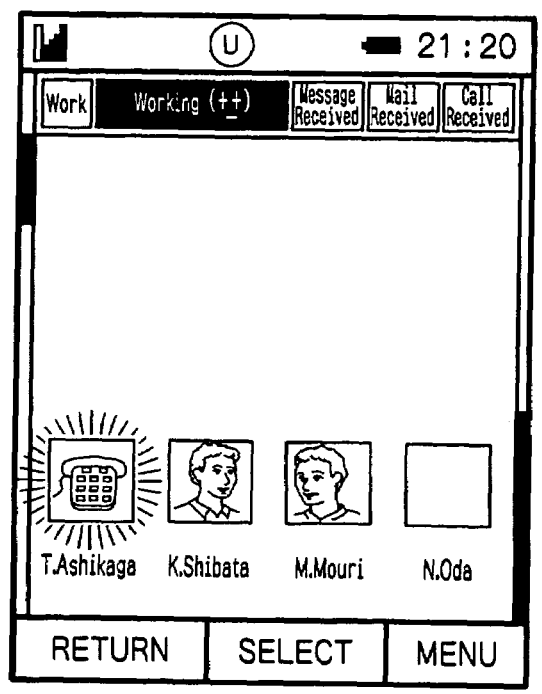

[FIG. 27] A diagram to illustrate another embodiment of the standby screen.

EXPLANATION OF REFERENCE NUMERALS 10 terminal device
105 antenna
111 liquid crystal display
114 touch-tone buttons
115 direction key
118 microphone
119 speaker
121 call-start button
122 call-end button
201 PIM application
202 address book module
202a address book database
203 instant message (IM) module
204 presence manager
204a list registration unit
204b update notifying information managing unit
204c updated presence information obtaining unit
205 scheduler
206 presence information database

DETAILED DESCRIPTION OF PREFERRED EMBODIMENTS

FIG. 1 is a diagram to illustrate a presence managing system configured with a presence server and terminal devices. In the presence managing system shown in FIG. 1, a terminal device A is a viewer of states of the other terminal devices, while a terminal device B discloses a state of itself. A server C is the presence server. The presence server C is provided with functionality to contain and administrate presence information provided by each terminal device and transmit the presence information to a requesting terminal device. In the example shown in FIG. 1, the presence server C has been provided with the presence information of the terminal device B in advance. Hereinafter, an example of a process of the system will be described. (1) Firstly, the terminal device A requests the presence server C for the presence information of the terminal device B to be disclosed. (2) Secondly, the presence server C provides the presence information to the terminal device A. Accordingly, the terminal device A obtaining the presence information of the terminal device B is now enabled to display the presence information of the terminal device B on a screen of the terminal device A. (3) Meanwhile, when the presence information of the terminal device B is modified, the terminal device B instructs the presence server to update the presence information. Thereafter, the presence server C updates the presence information of the terminal device B. (4) Thus, the updated presence information of the terminal device B is provided to the terminal device A. The system configuration with the presence server and the terminal devices is as described above. It is to be noted that the presence managing system shown in FIG. 1 is provided with two terminal devices; however, a plurality of terminal devices which serve as the terminal device B (i.e., the disclosing terminal device) may be provided so that the terminal device A can view the presence information of the plurality of terminal devices.

FIG. 2 illustrates an external view of a terminal device 10 being a presence indicative terminal device according to the embodiment of the present invention, and FIG. 3 is a block diagram to illustrate a hardware configuration of the terminal device 10. As shown in FIG. 2, a liquid crystal display 111 and an operation unit are provided on an operation panel side of a chassis of the terminal device 10. The operation unit includes touch-tone buttons 114, a direction key 115, a call-start button 121, and a call-end button 122. On an upper side of the operation panel, pores for a speaker 119 and an antenna 105 are provided while pores for a microphone 118 is provided on a lower side of the operation panel. In the present embodiment, a mobile phone is referred to as the terminal device of the present invention; however, the present invention can be applied to various terminal devices such as a PC, a PDA, a TV with various application programs installed, and the like, and application of the present invention is not limited to the mobile phone.

A block diagram shown in FIG. 3 will be described. The terminal device 10 is provided with a CPU 100 to control the entire device. A ROM 101, a RAM 102, a flash memory 103, a wireless communication control unit 104, a liquid crystal display 111, an input interface unit 113, and an audio control unit 117 are respectively connected to the CPU 100. Further, the wireless communication control unit 104 is connected with the antenna 105, the input interface unit 113 is connected with the keys in the operation unit, and the audio control unit 117 is connected with the microphone 118 and the speaker 119. The operation unit being connected with the input interface unit 113 includes a unit to move a pointer which is displayed on a screen and a touch panel utilizing the liquid crystal display 111.

The ROM 101 is a non-volatile read only memory to store various programs to be executed by the CPU 100 and fixed data. The RAM 102 is a writable memory which provides a work area for the CPU 100 and a temporary memory area of data. The flash memory 103 is a non-volatile rewritable memory to store additional application programs and various data.

The wireless communication control unit 104 is provided with functionality to wirelessly communicate to exchange audio and data with a base station through the antenna 105. The terminal device 10 is capable of exchanging data with the presence server through the base station. The liquid crystal display 111 composes a display unit having a screen. The input interface unit 113 is provided with functionality to receive inputting operations through the keys in the operation unit. The audio control unit 117 controls input and output of audio through the microphone 118 and the speaker 119.

FIG. 4 is a block diagram to illustrate a configuration of application programs and various features equipped in the terminal device 10. The terminal device 10 includes a PIM (Personal Information Manager) application 201. The PIM application 201 includes an address book module 202 (having an address book database 202a to store address book data), an instant message (IM) module 203, a presence manager 204, and a scheduler 205. Further, the terminal device is provided with a presence information database 206.

The presence manager 204 includes a list registration unit 204a, an update notifying information managing unit 204b, and an updated presence information obtaining unit 204c.

The list registration unit 204a is provided with a function to register a presence disclosing user in a list. That is, the terminal device 10 is capable of selecting an arbitrary terminal device among the terminal devices in the presence managing system disclosing the presence information and register the selected terminal devices as disclosing terminal devices (presence disclosing users). For example, users managed by the address book module 202 can be registered to be the presence disclosing users.

Hereinafter, referring to a flowchart shown in FIG. 5, operations to register a presence disclosing user among the users registered in the address book 202 will be described. In the present embodiment, an example, in which a person named Ashikaga, being registered in the address book 202 in the terminal device 10 belonging to a person named Matsuda, as a presence disclosing user, will be described. It is to be noted that illustrated screens to be referred to below are merely examples of the embodiment of the present invention and do not necessarily limit the scope of the invention.

FIG. 18 is an address book window to be displayed when the address book 202 is activated through a predetermined operation in S101. The address book window is a list of users who are registered in the address book. The users are generally grouped according to a predetermined method (e.g., an alphabetical order) and displayed in the address book window on the group basis. In FIG. 18, users having surnames, of which initial letters are vowels (A, I, U, E, O), are listed.

If Ashikaga is selected through the address book window as shown in FIG. 18 (S102), a detailed address window as shown in FIG. 6 is displayed (S103). In the present embodiment, the detailed address window is configured to include the presence information to be displayed. However, Ashikaga is not as yet registered as a presence disclosing user; therefore, a note "presence unregistered" is shown in FIG. 6 in place of the presence information.

If "menu" at lower right of the address book window is selected, an address book menu window as show in FIG. 7 is displayed. If "register presence" in the menu window is selected, an inquiry window as shown in FIG. 8 to inquire as to whether Matsuda should ask Ashikaga for mutual disclosure of the presence information is displayed. If "YES" in the inquiry window is selected, a request for mutual disclosure of the presence information is transmitted to the terminal device 10 of Ashikaga (S104). The terminal device 10 belonging to Ashikaga, in accordance with the request, displays a window as show in FIG. 9 to determine as to whether the request is accepted.

If the request is accepted (S105: YES), next, it is determined as to whether information necessary for registration of a presence disclosing user is included in the address book database (S106). The information necessary for registration of a presence disclosing user includes, for example, a user name, a telephone number, and an e-mail address, which are often already registered in the address book database. If the information is included (S106: YES), in S107, the information necessary for registration of a presence disclosing user is obtained from the address book database. If the necessary information is not included in the address book database (S106: NO), in S108, necessary information is obtained from the terminal device 10 belonging to Ashikaga via communication. When the information necessary for registration is obtained in S107 or S108, the obtained information is recorded in a list contained in the presence information database to be registered as the presence disclosing user (S109). Thereafter, a window as shown in FIG. 10 to notify of completion of the registration is displayed.

According to the process described above, a user being registered in the address book can be registered as a presence disclosing user. FIG. 19 illustrates a detailed address window with Ashikaga being registered in the list of presence disclosing users. It is to be noted that the presence information is displayed, which is unlike the window prior to the registration as shown in FIG. 6.

The list of presence disclosing users may be contained in the presence information database 206 or in another location in the terminal device 10.

The update notifying information managing unit 204b includes functionality to manage update information (i.e., information for updating the presence information to be provided by the presence server C. See FIG. 1) being provided by the presence server and received by the terminal device 10.

The updated presence information obtaining unit 204c includes functionality to judge as to whether updated presence information should be obtained based on the update information being received and obtains the updated presence information. According to the embodiment of the present invention, if a presence disclosing user who is included in the update information corresponds to a presence disclosing user who is displayed on the screen of the display terminal 10, or if the presence information of the presence disclosing user who is included in the update information corresponds to the presence information being displayed on the screen of the terminal device 10, the updated presence information is obtained.

The presence manager 204 is capable of, for example, displaying the presence information on a standby screen. Further, the presence manager 204 is capable of displaying an editing window for the presence information on the screen.

The address book module 202 is capable of, for example, displaying the presence information of a presence disclosing user who is selected through the detailed address window. Further, the presence information of the terminal device 10 may be configured and/or updated by using the address book module 202.

The scheduler 205 is provided with functionality to manage schedule information of the user of the terminal device 10. Additionally, the presence information may be set integrally with the schedule.

The presence information database 206 contains the presence information of the terminal device 10 and the presence disclosing users. As the updated presence information is obtained from the presence server, corresponding presence information in the presence information database 206 is overwritten.

Hereinafter, an operation in which a user sets his/her own presence information in the terminal device 10 will be described.

FIGS. 11 and 12 illustrate transition of windows when the user modifies his/her own presence information through the presence editing window. It should be noted that the illustrations shown in FIGS. 11 and 12 are merely examples of the present invention and do not limit the scope of the invention.

Figure 11A:
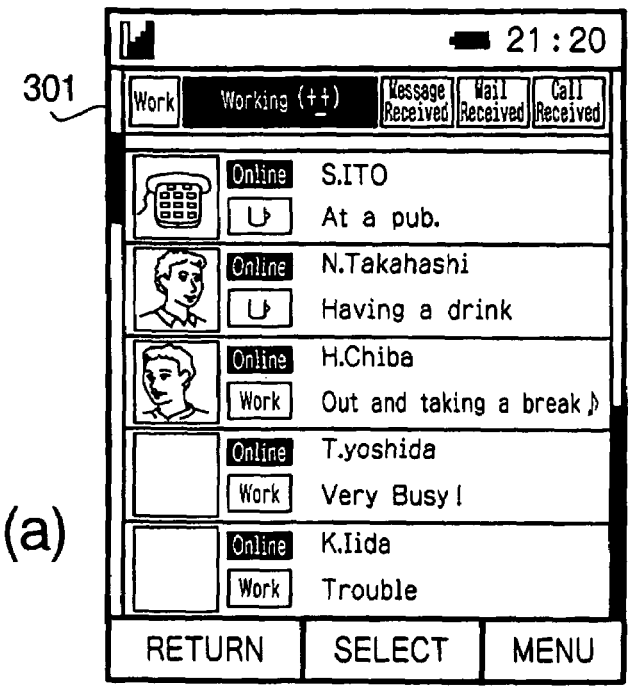

FIG. 11(a) illustrates a window which displays the presence information of a plurality of presence disclosing users. The presence information of the plurality of presence disclosing users is displayed, for example, on the standby screen. In this window, an uppermost row is a personal presence information displaying area 301, in which the user's own presence information is displayed. When a selection is made with the personal presence information displaying area 301 being focused on, for example, the window is switched to a window for setting the user's own presence information.

Figure 11B:
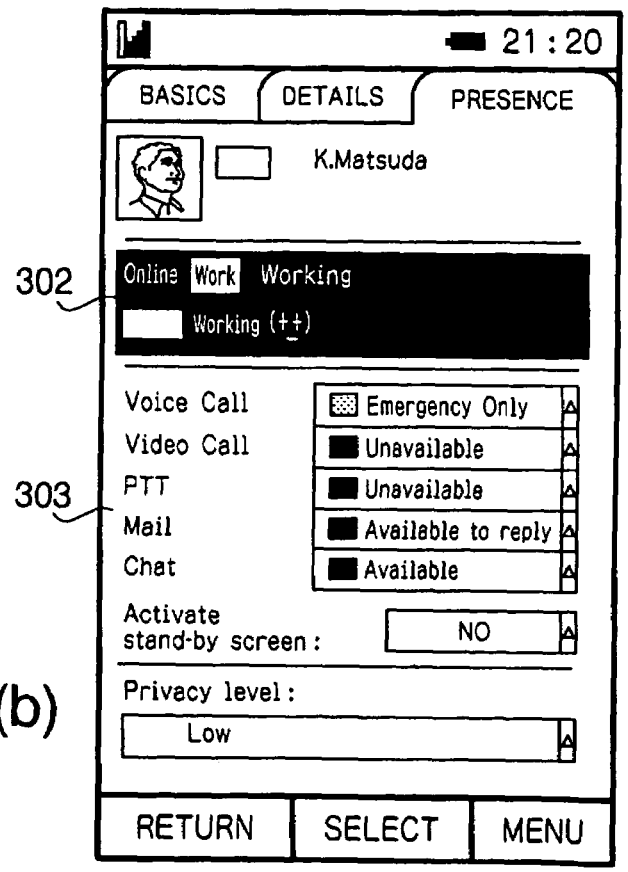

FIG. 11(b) illustrates the window for setting the user's own presence information. The window includes, for example, a primary status displaying area 302, in which primary status including "status" and a "comment" is displayed, and a secondary status displaying area 303, in which secondary status including "Voice Call," "Video Call," "PTT," "Mail," and "Chat" is displayed. In the present example, the "status" indicates "Working," and the "comment" indicates "Working (+_+)." Further, "Voice Call," "Video Call," "PTT," "Mail," and "Chat" respectively indicate "Emergency only," "Unavailable," "Unavailable," "Available to reply," and "Available." Further, the user may configure, for example, activation/inactivation of the standby screen and a privacy level (in which, for example, the presence disclosing users being registered in the list are grouped by intimacy so that the user's own presence information can be exclusively disclosed to predetermined presence disclosing users).

In FIG. 11(b), for example, when a selection is made with the primary status displaying area 302 including the "status" and the "comment" being focused on, the window is switched to the editing window for the presence information (FIG. 12).

Figures 12A, 12B, 12C:
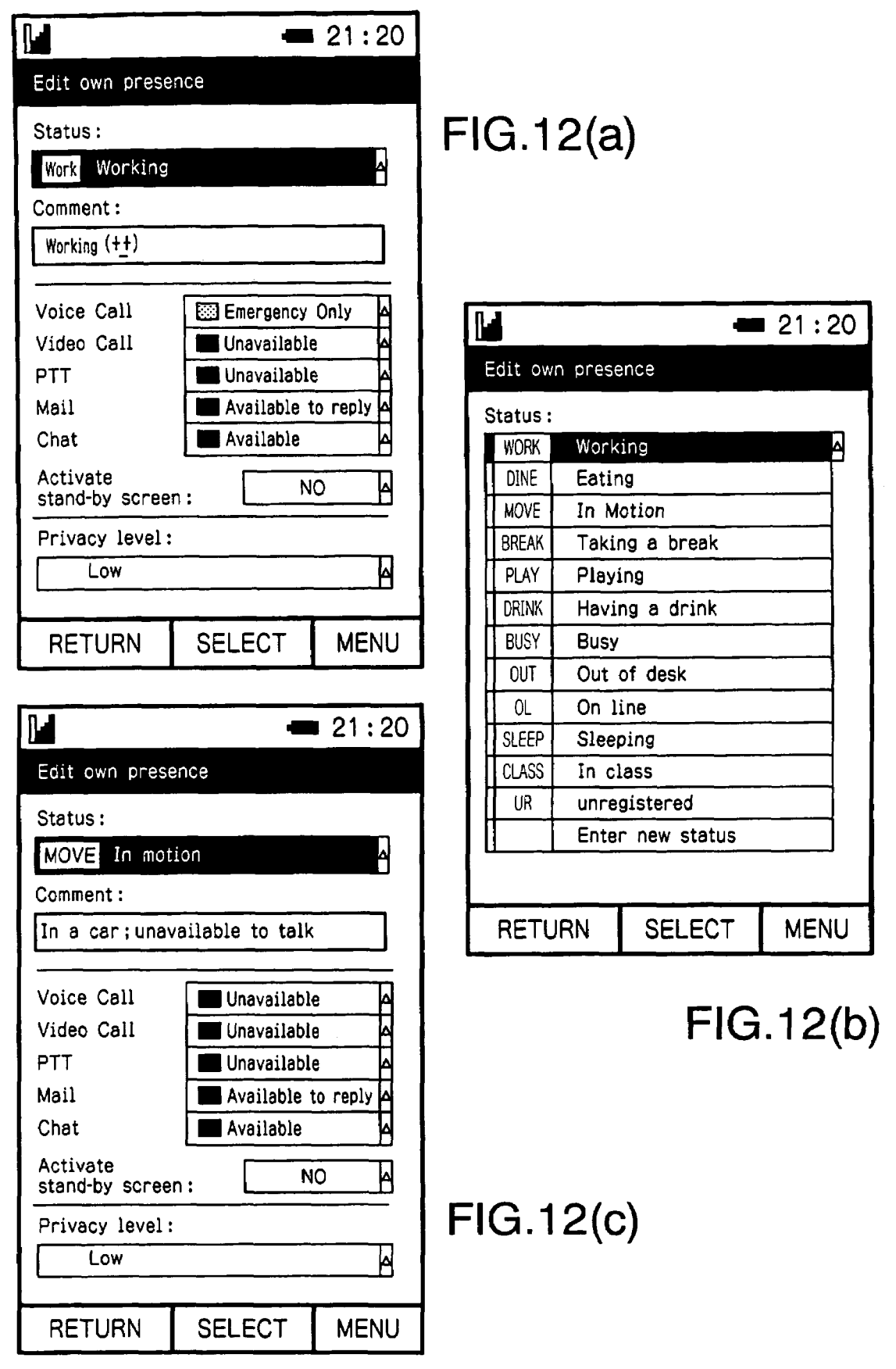

FIG. 12 illustrates the editing window for the presence information. When, for example, the "status (Working)" is modified, a selecting operation to focus on the corresponding area is given (see FIG. 12(a)). Accordingly, as shown in FIG. 12(b), options for the "status" are presented. The options for the "status" include, for example, "Working," "Eating," "In motion," "Taking a break," "Having fun," "Drinking," "Busy," "Away from desk," "Line occupied," "Sleeping," "In class," "Unregistered," and "Enter new status."

In FIG. 12(b), for example, an OK button is pressed with the item "In motion" being selected, the window is switched to another window as shown in FIG. 12(c). In the editing window for the presence information shown in FIG. 12(c), in accordance with the "status" changed from "Working" to "In motion," the "comment" is changed from "Working (+_+)" to "In a car; unable to talk." Further, "Voice Call" is changed from "Emergency only" to "Unavailable." It is to be noted, according to the embodiment of the present invention, the items in the secondary status are determined depending on the status (e.g., "Working," and "In motion") indicated in the primary status. For example, the items in the secondary status corresponding to the primary status "Working" are:

Voice Call: Emergency only.
Video Call: Unavailable.
PTT: Unavailable.
Mail: Available to reply.
Chat: Available.

For another example, the items in the secondary status corresponding to the primary status "In motion" are:

Voice Call: Unavailable.
Video Call: Unavailable.
PTT: Unavailable.
Mail: Available to reply.
Chat: Available In the above configuration, the presence information of the items in the secondary status is not required to be manually changed; therefore, a user friendly operation to set the presence information is achievable. Alternatively, however, the presence information can be respectively configurable. After editing the presence information, for example, when the OK in the lower right of the window is selected, an instruction to update the presence information of the terminal device 10 is transmitted to the presence server.

In FIGS. 11 and 12, the presence information is edited through the editing window for the user's own presence information. However, the presence information may be edited, for example, by using the scheduler 205, which is one of the PIM application programs 201.

FIG. 13 is a flowchart to illustrate a process to be executed when the presence information of a presence disclosing user who is registered in the list is updated. The presence managing system configured with the presence server and the terminal devices 10 corresponds to the presence managing system shown in FIG. 1. It is to be noted that the terminal device 10 which will be described hereinbelow corresponds to the terminal device A (viewer) in the presence managing system shown in FIG. 1.

In S201, a standby screen is displayed on the liquid crystal display 111. In the present embodiment, presence information of a designated presence disclosing user is displayed in the standby screen. Thus, the user of the terminal device 10 can designate some of the presence disclosing users who are registered in the list to be displayed on the screen. Additionally, specific items of the presence information of the designated presence disclosing users to be displayed can be selectively designated. In S202, the terminal device 10 receives update information, which is transmitted from the presence server C to inform the user that the presence information of the listed presence disclosing user has been updated. The update information includes information to notify the user that the presence information of at least one of the presence disclosing users who are registered in the terminal device 10 has been updated. However, the update information does not include information to update the presence information, such as information indicating current status of the presence having been modified.

In S203, it is judged that the presence information of the presence disclosing users being displayed in the standby screen has been updated based on information being included in the received update information. If it is judged that the presence information of the presence disclosing users being displayed in the standby screen has been updated (S203: YES), the process proceeds to S204. If no presence information of the presence disclosing users being displayed in the standby screen has been updated (S203: NO), the process proceeds to S205. The operation in S203 is performed by the update notifying information managing unit 204*b*.

In S204, the updated presence information, concerning the presence information of the presence disclosing users who are displayed in the standby screen provided from the presence server C, is received. Next, the presence information of the presence disclosing users which is contained in the presence information database 206 is updated according to the received updated presence information. The operation in S204 is performed by the updated presence information obtaining unit 204*c*. According to the update of the presence information, the display of the presence information in the standby screen is modified. Thereafter, the process proceeds to S205. In S204, it should be noted that when the presence information from the presence server C is received, solely the updated presence information corresponding to the presence information being displayed in the screen may be received. Thus, the updated presence information corresponding to the presence information of the presence disclosing user, which may have been updated but is not displayed in the screen, may not necessarily be received. Therefore, in this configuration, data traffic to be exchanged for updating the presence information can be reduced.

In S205, it is judged as to whether the presence information of the presence disclosing users which is not displayed in the stand by screen has been updated. If it is judged that there is a presence disclosing user, of which presence information should be updated (S205: YES), the process proceeds to S206. If no presence disclosing user is to be updated (S205: NO), the process proceeds to S207.

In S206, information indicating that the presence information of the presence disclosing users, who are other than the presence disclosing users being displayed in the standby screen, is not yet updated is displayed in the standby screen. Thereafter, the process proceeds to S207.

In S207, it is judged as to whether an instruction to display the address book is given. If the instruction to display the address book is given (S207: YES), the process proceeds to a flowchart A, which will be described later. If the instruction to display the address book is not given, the process is terminated. Thus, in this process, the presence information of the presence disclosing users which is not displayed and not yet updated is not updated even if the received update information notifies the update.

Hereinafter, operations including steps from S201 to S206 shown in FIG. 13 will be described with reference to diagrams representing transition of the screen. It should be noted that although FIGS. 14 through 16 illustrate an embodiment of the present invention, the scope of the present invention is not limited to these screen displays.

FIG. 14 is a diagram to illustrate the standby screen to be displayed in the process of S201. The presence disclosing users displayed in the standby screen are T. Ashikaga, K. Shibata, M. Mouri, and N. Oda. The presence information for the respective presence disclosing users, which includes primary status "At a pub" for Ashikaga, "Having a drink" for Shibata, "Out and taking a break" for Mouri, and "Very busy!" for Oda respectively, is displayed.

Meanwhile, it is assumed the presence information of T. Ashikaga, K. Katoh, D. Saito who are presence disclosing users, registered in the terminal device 10, is updated within the respective terminal devices. For example, as shown in FIG. 15, the primary status of Ashikaga is changed to "in motion; unavailable to talk" (FIG. 15(*a*)), the primary status of Katoh is changed to "Having a drink; who wants to join?" (FIG. 15(*b*)), and the primary status of Saito is changed to "Sleeping; contact me later" (FIG. 15(*c*)). Accordingly, in the presence server C, the presence information of the presence disclosing users is updated. Thereafter, the presence server C transmits the update information, which indicates that the presence information of Ashikaga, Katoh, and Saito has been modified, to the terminal device 10. The update information being transmitted is received by the terminal device 10 (S202).

FIG. 16 is a diagram to illustrate the standby screen after the updating process in S204 and the displaying process in S206. The presence information of Ashikaga is changed from "At a pub" to "Unavailable to talk." Further, in an upper portion of the screen, a sign "U" is displayed. The sign "U" indicates that the presence information of the presence disclosing users, who are other than the presence disclosing users being displayed, has not yet been updated (i.e., unupdated).

Next, a feature to update presence information being displayed by the address book module will be described with reference to a flowchart A shown in FIG. 17.

In S301, an address book window is displayed on the liquid crystal display 111. Methods to display the address book may include, for example, (A) alphabetical order, (B) in groups, and (C) in temporal groups, etc., and various other methods to sort the presence information can be anticipated. Thus, the user names are displayed on the screen based on the sorted result.

In S302, it is judged as to whether the user names of the presence disclosing users which are included in the update information (excluding user names of the presence disclosing users which are updated in S204) are displayed on the screen. If the user names of the presence disclosing users which are included in the update information are displayed (S302: YES), the process proceeds to S303. If the user names of the presence disclosing users which are not included in the update information are not displayed (S302: NO), the process proceeds to S304. In this regard, the judgment in S302 is made by the update notifying information managing unit 204*c* according to the user names being displayed on the address book window and judged by the address book module 202.

In S303, the presence information is updated according to receipt of the presence information of the presence disclosing users, which are included in the update information being judged in S302 to be displayed in the address book window. Thereafter, the process proceeds to S304. In this regard, the operation in S303 is performed by the updated presence information obtaining unit 204*c*.

In S304, it is judged as to whether the windows are switched. Switching the windows include, for example, an explicit instruction to switch the windows given by the user (e.g., an operation to display a list of users having an initial S in place of a list of users having an initial K) and an instruction to terminate the updating process. Additionally, automatic switching executed by the terminal device where necessary can be included. According to such a switching operation (S304: YES), the process returns to S302, and the process is repeatedly applied to a newly displayed user. If no switching is performed (S304: NO), the process proceeds to S305.

In S305, it is judged as to whether an operation to return to the standby screen is given. In other words, the terminal device 10 judges as to whether an instruction to terminate the address book module 202 (although it can be maintained to be active) and return to the standby screen is given while the user can give various operations through the address book module 202. If the operation to return to the standby screen is given (S305: YES), the process proceeds to S306. If no operation to return to the standby screen is given (S305: NO), the process proceeds to S304.

In S306, the standby screen is displayed. Next, in S307, it is judged as to whether there remains an unupdated presence disclosing user. If an unupdated presence disclosing user is found (S307: YES), the process is terminated. If no unupdated presence disclosing user is found, i.e., the presence information of the entire presence disclosing users which is included in the update information has been updated (S307: NO), the process proceeds to S308, and display of the sign to indicate that an unupdated presence disclosing user still remains is ceased. Thereafter, the process concerning updating the presence information is terminated.

Hereinafter, operations including steps from S301 to S307 shown in FIG. 17 will be described with reference to diagrams representing transition of the screen. It should be noted that although FIGS. 18 through 27 illustrate an embodiment of the present invention, the scope of the present invention is not limited to these screen displays.

FIG. 18 is an address book window to be displayed in the operation in S301. The users having surnames, of which initial letters are vowels (A, I, U, E, O), are listed in the address book window. Among the users being displayed, T. Ashikaga is the presence disclosing user who is included in the update information. It is to be noted that at this stage the presence information of Ashikaga has been updated in S204 shown in FIG. 13. Therefore, Ashikaga does not correspond to be the presence disclosing user who is examined in S302 shown in FIG. 17.

FIG. 19 is illustrates a detailed address window to be displayed when T. Ashikaga is selected in FIG. 18. In the embodiment of the present invention, the detailed address window also contains the presence information. For Ashikaga, the presence information having been updated in S204 shown in FIG. 17 is displayed. Therefore, the primary status of Ashikaga is updated to be "In motion; unavailable to talk."

Next, FIG. 20 illustrates the address book window, in which users having an initial K are displayed. Among the users being displayed, Katoh corresponds to the presence disclosing user to be examined in S302 shown in FIG. 17. Therefore, in this stage, the presence information of Katoh is updated in S303 shown in FIG. 17.

FIG. 21 illustrates the detailed address window to be displayed when K. Katoh is selected in FIG. 20. It is to be noted that the primary status of Katoh is updated to be "Drinking; who wants to join?"

Next, FIG. 22 illustrates the address book window, in which users having an initial S are displayed. Among the users being displayed, Saito corresponds to the presence disclosing user to be examined in S302 shown in FIG. 17. Therefore, in this stage, the presence information of Saito is updated in S303 shown in FIG. 17. When D. Saito is selected in FIG. 22, the detailed address window as shown in FIG. 23 is displayed. (It is to be noted that the primary status of Saito is updated to be "Contact me later.") When an operation to return to the standby screen is given by the user (S305: YES), the standby screen as shown in FIG. 24 is displayed (S306). It should be noted that the sign "U" indicating an unupdated presence disclosing user still remains is ceased.

Optionally, for example in the address book windows shown in FIGS. 18, 20, 22, when "Menu" in the lower right is selected, a menu window for address book (FIG. 25) can be displayed. The menu window for address book may include, for example, an item to provide an instruction to update the presence information without displaying the unupdated presence information in the window, such as "update the entire presence information."

FIG. 26 illustrates the standby screen according to another embodiment of the present invention. It is to be noted that the standby screen shown in FIG. 26 is merely an example of the present invention, and the scope of the present invention is not limited by the representation.

FIG. 26 can be replaced with FIG. 14 (i.e., the standby screen to be displayed in S201). The presence disclosing users being displayed on the standby screen are T. Ashikaga, K. Shibata, M. Mouri, and N. Oda. In FIG. 26, items to be displayed to represent the presence information are images and names of the users.

The presence information may include, for example, a plurality of items such as status information (information included in the primary status and the secondary status) and picture information. (For example, pictures with frames may be displayed, and colors of the frames may be changed depending on the online/offline status of the presence disclosing users to indicate the presence information.) The items to be displayed on the screen to indicate the presence information among the plurality of items can be designated by the user. (The items can be designated as well in FIG. 14, similarly to FIG. 26.) For example, solely updated presence information concerning the presence information which is represented by the designated items may be obtained when the presence information is updated. For example, when the user designates pictures to be displayed but comment not to be displayed among the items to represent the presence information, it can be configured such that updated presence information concerning a comment should not be received even when update information to indicate that a comment in the primary status has been updated is received. Therefore, according to the configuration, an even more amount of data to be exchanged for updating the presence information can be reduced.

FIG. 27 illustrates the standby screen immediately after the presence information is updated. FIG. 27 may be replaced with FIG. 16, which is the diagram to illustrate the standby screen after the updating operation in S204 and the displaying operation in S206. In FIG. 27, similarly to FIG. 16, the presence information of Ashikaga is updated. In the standby screen shown in FIG. 27, it is assumed that the image (or a frame of the image) of Ashikaga, whose presence information has been updated, blinks. Thus, the user of the terminal device 10 can recognize the presence information of Ashikaga has been updated (or at least one item in the presence information has been updated) when the user views the blinks of the image of Ashikaga. Moreover, the user can confirm the updated presence information through the detailed address window. (Optionally, an instruction to obtain updated presence information corresponding to the items to represent the presence information can be provided through the detailed address window.) It is to be noted that in the above embodiment the image is blinked in order to notify the user of the update of the presence information; however, according to the present invention, the method to notify the update is not limited to blinking, but may include, for example, changing colors in the images, changing sizes of the images, and displaying text, etc.

According to the flowcharts shown in FIGS. 13 and 17, the presence information can be updated by displaying the standby screen or the address book window; however, according to the present invention, occasions to update the presence information being displayed are not limited to the cases when the standby screen and the address book window are displayed. For example, call receipt records, mail receipt history, and the like being displayed in respective windows may be considered to be the presence information being displayed.

As has been described above, according to the present invention, a large amount of data can be prevented from being exchanged in order to display the presence information of the other terminal devices in the presence indicative terminal device. It is to be noted, in a conventional technique, that a server (including a presence server) can notify the user of the update so that the presence indicative terminal device can pull-obtain the information based on the notification if necessary. However, according to the present invention, an object of pull-obtainment is limited to the information concerning the presence information being displayed on the screen so that the desired presence information can be automatically updated even without an instruction from the user to pull-obtain the information. Thus, the presence indicative terminal device, in which the data to be exchanged can be reduced and the usability for the user is improved; can be provided. Moreover, according to an embodiment of the present invention, footprint history (i.e., a feature to recognize viewers who viewed the user's own presence information), in which the presence server can recognize the updated presence information, can be generated.

Further, according to the embodiment of the present invention, solely information to notify the user of the update/unupdate of the presence information is provided by the server to the presence indicative terminal device. Accordingly, the presence indicative terminal device recognizes the presence of the presence disclosing users being displayed on the screen and requests the server for the update information corresponding to the presence information being displayed on the screen. Thus, solely the presence information which is desired by the user to be updated is updated so that the burden on the server and the communication environment due to the mass data exchange can be prevented.

According to an embodiment of the present invention, the updated presence information obtaining unit judges as to whether the presence-enabled targets being displayed by the display control unit are included to be the presence-enabled targets, of which presence information is updated when the presence-enabled targets are displayed by the display control unit, and obtains the updated presence information of the presence-enabled targets being displayed when it is judged that the presence-enabled targets are included.

According to another embodiment of the present invention, the updated presence information obtaining unit judges, when the update information receiving unit receives the update information, as to whether the presence information of the presence-enabled targets being displayed by the display control unit is updated based on the update information and obtains the updated presence information of the presence-enabled targets of which presence information is judged to be updated.

With the above configurations, the update information concerning the presence information which can be considered to be desired by the user, can be specifically obtained in appropriate timing. Therefore, the presence indicative feature can be accomplished in a small communication amount without reducing usability.

According to an embodiment of the present invention, the display control unit displays the presence-enabled targets designated by a user among the presence-enabled targets being registered on a screen.

With the above configuration, the user can be provided with the updated presence information concerning the others, while the user desires to view the presence information of the others.

According to an embodiment of the present invention, the presence information of the presence-enabled targets being displayed by the display control unit includes a plurality of items to represent the presence information, the presence indicative terminal device further includes a display item designating unit to designate items to be displayed on the screen among the plurality of items, and wherein the updated presence information obtaining unit specifically obtains the updated presence information concerning the designated items to be displayed.

With the above configuration, the presence information required by the user is specifically updated to be displayed on the screen. Thus, unnecessary data exchange can be eliminated, and the necessary information is specifically displayed on the screen; therefore, the usability is improved.

According to an embodiment of the present invention, the updated presence information obtaining unit obtains the updated presence information from a server which is equipped in a communication network to manage the presence information.

According to another embodiment of the present invention, the update information is provided by a server which is equipped in a communication network to manage the presence information (optionally by the update information transmitting unit), and the update information receiving unit receives the provided update information.

With the above configurations, the presence indicative terminal device is not required to be directly connected with the other terminal device in order to obtain the updated presence information (or to provide the update information). Therefore, the entire data communication to be required to obtain the updated presence information (or provide the update information) can be downsized. Further, the updated presence information can be obtained (or the update information can be provided) even when the other terminal is incapable of communicating; therefore, the usability is improved.

According to an embodiment of the present invention, the presence indicative terminal device is provided with a feature to function as a mobile phone.

Optionally, at least one of the first terminal device and the second terminal device is provided with a feature to function as a mobile phone.

Usability of services for mobile phones can be affected largely by the presence of the users. In other words, usability of the services can be largely improved by the use of the presence indicative feature. Therefore, with the above configurations, the presence indicative feature can be effectively used.

According to an embodiment of the present invention, the display control unit displays the predetermined presence-enabled target on a standby screen.

With the configuration in which the presence-enabled targets are displayed on the continuously-displayed standby screen, the user can view the latest presence information of the concerned presence-enabled targets without a specific operation. Therefore, the presence indicative feature can be effectively used.

According to an embodiment of the present invention, the display control unit displays the predetermined presence-enabled target which corresponds to a user appearing on an address book screen.

It is to be noted that, when the address book screen is displayed, in many cases, the user is attempting to communicate with another; therefore, it is highly possible that reference of the presence information is desired. Therefore, with the above configuration, the presence information is updated in preferable timing to be provided, so that the presence indicative feature can be effectively provided without increasing unnecessary communication.

According to an aspect of the present invention, the presence indicative terminal device or the presence managing system is further equipped with address book data containing address information of a communicate, and the registration unit registers the presence-enabled targets based on the address book data.

With use of the address book data, the presence-enabled targets can be registered without troublesome input operations. Further, when information necessary for the registration is contained in the address book database, it is not required to obtain the information from the other terminals so that the registration can be accomplished in shorter time and the amount of data exchange can be reduced.

According to an aspect of the present invention, the registered information of the presence-enabled targets is registered to form a part of address book data. Therefore, the presence-enabled target registration information containing unit is an address book.

Thus, the registration of the presence-enabled targets is accomplished by the address book, the terminal device and the system in simple configurations can be achieved.

Configurations of the presence indicative terminal device and the presence managing system according to an aspect of the present invention are not limited to the configurations described above, but there are numerous variations and permutations of the presence indicative terminal device and the presence managing system that fall within the spirit and scope of the invention.

For example, the terminal device may not necessarily be equipped with the single-purpose list to register the presence-enabled targets. In such a configuration, for example, the terminal device may be configured to contain presence registration information, as a part of the address book information to be contained in the address book database. For example, a flag to indicate as to whether a user corresponding to a record in the address book database is designated to be a presence-enabled target may be provided so that the presence registration information can be contained in the address book database. In this regard, additional information (e.g., user names, telephone numbers, and mail addresses) necessary for registration of the presence disclosing users can be stored in the address book 202; therefore, a configuration in which the address book module 202 directly manages registration of the presence disclosing users is possible.

For another example, the operations to register the presence disclosing users are performed manually by the user of the terminal device 10; however, the presence disclosing users may be, automatically registered, for example, by the address book module 202. In such a configuration, for example, entire users who may be registered to be in a predetermined group (e.g., "friend") can be automatically registered to be the presence-enabled targets. In this configuration, procedures to register the presence disclosing users one-by-one can be eliminated.

For another example, a frequency to update the presence-enabled targets being displayed on the screen and a frequency to update the other presence-enabled targets can be varied. Thereby even the presence-enabled targets other than the presence-enabled targets being displayed can be updated with the predetermined timing being set. Further, for example, only images or comments among the items to represent the presence information may be obtained to be updated. Furthermore, the presence server may not necessarily provide the update information concerning the updates of the entire presence-enabled targets being registered, but may recognize the presence-enabled targets being displayed (or items to represent the presence information of the presence-enabled targets) in advance so that the update information or the updated presence information exclusively for the presence-enabled targets may be push-delivered. Still further, alternatively to the push-delivery from the presence server, the presence indicative terminal device may pull-obtain the information from the presence server periodically.

For another example, the presence-enabled targets to be displayed may not necessarily be based on individual designation by the user. It may be configured such that, for example, the presence-enabled targets online are exclusively displayed, a display order is varied according to authorization levels of the communication, etc.

For another example, possible cases for data exchange concerning the presence information include (1) a case in which the presence information is managed by the presence server to transmit to the presence indicative terminal devices and (2) a case in which the presence server only manages IP addresses, and the presence information is exchanged in peer-to-peer communication.

For another example, it may be noted in S206 in FIG. 13 that, when there remain the presence disclosing users, of which presence information is yet to be updated, information to indicate existence of such unupdated presence disclosing users; however, the display of those is not mandatory. For the flowchart shown in FIG. 17, the description is based on the configuration in which the presence information is presented on the standby screen; however, the configuration is not limited. The standby screen may not be configured to have a feature to display the presence information, and the presence information may be displayed through the address book. Further, the updated presence information obtaining unit 204c may be configured to obtain the difference data of the updated presence information to update the presence information.

What is claimed is:

1. A presence indicative terminal device, comprising:
one or more processors operatively coupled to a memory, wherein the memory comprises
computer-executable instructions, which,
when executed by the one or more processors, cause the one or more processors to:
register a plurality of presentities;
receive update information, which informs that presence information of at least one of the registered presentities has been updated;
cause a display of one or more of the registered presentities;
determine whether the presence information of presentities, which are a subset of the registered presentities displayed on a predetermined screen, should be updated based on the update information, and to obtain updated presence information of only the presentities displayed on the predetermined screen of which presence information is determined to be updated, and to not determine as to whether presence information of presentities other than the presentities displayed on the predetermined screen should be updated; and cause a display of the obtained updated presence information.

2. The presence indicative terminal device according to claim 1, wherein the determining occurs when the update information is received.

3. The presence indicative terminal device according to claim 1, wherein the computer-executable instructions further comprise instructions for receiving a user's designation of one or more of the registered presentities for display on the predetermined screen.

4. The presence indicative terminal device according to claim 1, wherein the presence information of the presentities includes a plurality of items to represent the presence information;

wherein the computer-executable instructions further comprise instructions for:

receiving a user's designation of items from the plurality of items to be displayed on the predetermined screen; and obtaining the updated presence information concerning the designated items to be displayed.

5. The presence indicative terminal device according to claim 1, wherein the computer-executable instructions further comprise instructions for obtaining the updated presence information from a server which is equipped in a communication network to manage the presence information.

6. The presence indicative terminal device according to claim 1, wherein the update information is provided by a server which is equipped in a communication network to manage the presence information; and wherein the computer-executable instructions further comprise instructions for receiving unit receives the provided update information.

7. The presence indicative terminal device according to claim 1, wherein the terminal device is a mobile phone.

8. The presence indicative terminal device according to claim 1, wherein the predetermined screen is a standby screen.

9. The presence indicative terminal device according to claim 1, wherein the displayed presentities correspond to one or more users appearing on an address book screen.

10. The presence indicative terminal device according to claim 1, the memory further comprising address book data containing address information of a communicatee; and the computer-executable instructions further comprising instructions for: registering the plurality of presentities based on the address book data.

11. The presence indicative terminal device according to claim 10, wherein the computer-executable instructions further comprise instructions for accepting a user's operations to register the presentities through an address book screen.

12. The presence indicative terminal device according to claim 1, wherein the computer-executable instructions further comprise instructions for registering an address book data corresponding to one or more of the plurality of presentities.

13. The presence indicative terminal device according to claim 1, wherein the computer-executable instructions further comprise instructions for:

when new presentities are displayed on the predetermined screen by the display control unit, determining whether the presence information of the new presentities should be updated, and to obtain the updated presence information of the new presentities of which presence information is determined to be updated.

14. A server used, in a presence managing system comprising a first terminal device to view presence information and a second terminal device to disclose the presence information, to provide information concerning the presence of the second terminal device to the first terminal device, the server comprising:

one or more processors operatively coupled to a memory, wherein the memory comprises computer-executable instructions, which, when executed by the one or more processors, cause the one or more processors to:

obtain the presence information of the second terminal device;

obtain a presentity registration information, which represents the second terminal device being registered in the first terminal device as a presentity;

transmit an update information, which indicates that the presence information of the second terminal device includes updated information, to the first terminal device, in which the second terminal device is registered as the presentity, based on the presentity registration information, when the presence information of the second terminal device is updated; and transmit the updated presence information of the second terminal device, from the server, to the first terminal device based on a request from the first terminal device, wherein the request from the first terminal device is made to the server only when the presentity is displayed on a predetermined screen of the first terminal device.

15. A computer-enabled method to manage presence information of a plurality of presentities, comprising:

registering, by one or more processors, the plurality of presentities;

displaying, on a predetermined screen, one or more of the registered presentities;

receiving, by the one or more processors, update information, which informs that presence information of at least one of the registered presentities has been updated;

determining, by the one or more processors, whether the presence information of presentities, which are a subset of the registered presentities displayed on the predetermined screen, should be updated based on the update information, and not determining whether presence information of presentities other than the presentities displayed on the predetermined screen should be updated;

obtaining the updated presence information of only the presentities displayed on the predetermined screen of which presence information is determined to be updated; and displaying, on the predetermined screen, the obtained updated presence information.

16. The method according to claim 15, wherein the obtaining the updated presence information is performed when the update information is received.

17. A computer-enabled method to manage presence information to be implemented on a server used, in a presence manageable system having a first terminal device to view the presence information and a second terminal device to disclose the presence information, to provide information concerning the presence of the second terminal device to the first terminal device, the method comprising:

storing, in a memory, the presence information of the second terminal device;

storing, in the memory, presentity registration information, which represents the second terminal device being registered in the first terminal device as a presentity;

transmitting, by one or more processors, an update information, which indicates that the presence information of the second terminal device includes updated information, to the first terminal device, in which the second terminal device is registered as the presentity, based on the presentity registration information being stored, when the presence information of the second terminal device is updated; and transmitting, by the one or more processors, the updated presence information of the second terminal device, from the server, to the first terminal device based on a request from the first terminal device, wherein the request from the first terminal device is made to the server only when the presentity is displayed on a predetermined screen of the first terminal device.

18. A non-transitory computer-readable storage medium having computer-executable instructions which, when executed by one or more processors, cause the one or more processors to manage presence information of a plurality of presentities, the computer-executable instructions comprising instructions for:

registering the plurality of presentities;

causing a display, on a predetermined screen, of one or more of the registered presentities;

receiving update information, which informs that presence information of at least one of the registered presentities has been updated;

determining whether the presence information of presentities, which are a subset of the registered presentities displayed on the predetermined screen, should be updated based on the update information, and not determining as to whether presence information of presentities other than the presentities displayed on the predetermined screen should be updated;

obtaining the updated presence information of only the presentities displayed on the predetermined screen of which presence information is determined to be updated; and causing a display, on the predetermined screen, of the obtained updated presence information.

19. The non-transitory computer-readable storage medium according to claim 18, wherein the computer-executable instructions further comprise instructions for:

obtaining the updated presence information when the update information is received.

20. A non-transitory computer-readable storage medium having computer-executable instructions which, when executed by one or more processors, cause the one or more processors to manage presence information in a presence manageable system, the system having a first terminal device to view the presence information, a second terminal device to disclose the presence information, and a server to provide information concerning the presence of the second terminal device to the first terminal device, the computer-executable instructions comprising instructions for:

storing the presence information of the second terminal device;

storing presentity registration information, which represents the second terminal device being registered in the first terminal device as a presentity;

transmitting an update information, which indicates that the presence information of the second terminal device includes updated information, to the first terminal device, in which the second terminal device is registered as the presentity, based on the presentity registration information being stored when the presence information of the second terminal device is updated; and transmitting the updated presence information of the second terminal device, from the server, to the first terminal device based on a request from the first terminal device, wherein the request from the first terminal device is made to the server only when the presentity is displayed on a predetermined screen of the first terminal device.

\* \* \* \* \*